United States Patent
Rasool et al.

(10) Patent No.: US 9,277,451 B1
(45) Date of Patent: Mar. 1, 2016

(54) REDUCTION OF NETWORK LOADING DUE TO MULTIPLE DEVICE CONNECTIONS IN WIRELESS DATA NETWORKS

(71) Applicant: Sprint Spectrum LP, Overland Park, KS (US)

(72) Inventors: Shahzada Rasool, Sterling, VA (US); Daniel Vivanco, Sterling, VA (US); Muhammad Naim, Sterling, VA (US); Yu Zhou, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 333 days.

(21) Appl. No.: 13/783,013

(22) Filed: Mar. 1, 2013

(51) Int. Cl.
*H04W 72/00* (2009.01)
*H04W 28/08* (2009.01)

(52) U.S. Cl.
CPC .................................. *H04W 28/085* (2013.01)

(58) Field of Classification Search
CPC .................................................. H04W 28/085
See application file for complete search history.

(56) References Cited

U.S. PATENT DOCUMENTS

| 6,400,752 | B1* | 6/2002 | Suzuki et al. | 375/133 |
| 2006/0172769 | A1* | 8/2006 | Oh | H04W 36/30 455/557 |
| 2009/0005005 | A1* | 1/2009 | Forstall et al. | 455/411 |
| 2012/0324047 | A1* | 12/2012 | Diner et al. | 709/217 |
| 2014/0133332 | A1* | 5/2014 | Lee | H04W 88/04 370/252 |

* cited by examiner

*Primary Examiner* — Pakee Fang

(57) ABSTRACT

In systems and methods for reducing network traffic generated by a plurality of wireless devices operating over a communication network, an indication is received at an access node when a plurality of wireless devices assigned to a subscriber operate simultaneously as active wireless devices over a communication network. A priority list of the active wireless devices arranged according to the highest priority based on operating parameters of the active wireless devices is compiled. One of the active wireless devices is selected as a wireless host device based on the active wireless devices based upon the compiled priority list. Channel state data received from the active wireless devices at the access node is correlated to determine whether the active wireless devices and the wireless host device are in close proximity with each other. A wireless connection is established between the wireless host device and the active wireless devices, that are found to be in close proximity of wireless host device.

18 Claims, 5 Drawing Sheets

REDUCTION OF NETWORK LOADING DUE TO MULTIPLE DEVICE CONNECTIONS IN WIRELESS DATA NETWORKS

TECHNICAL BACKGROUND

With the advancements and innovations in cellular communication systems, such as the development of wireless data technologies including the Fourth Generation (4G) Long Term Evolution (LTE) wireless technologies, 4G devices have exploded in popularity. Thus, it is expected that, in the near future, an average subscriber may have several 4G-capable devices registered for use with a communication network. These 4G-capable devices may include, for example, smart phones, laptops, cameras, vehicles, etc.

A 4G wireless network can support large numbers of wireless subscribers running one or more applications, wherein the data traffic is packetized and transported via IP networks. However, the total bandwidth capability of a 4G network is fixed. When the number of 4G-capable devices connected to the network increases, the overall efficiency of the network declines. For example, a 4G-capable car may connect to the network while being driven by the subscriber. As the subscriber drives the 4G-capable car, the subscriber's smart phone may also connect to the network to synchronize the subscriber's emails. In this scenario, both the 4G-capable car and the smartphone will have active connections with the network. Simultaneous data connections received from multiple devices can cause a sudden peak in the network loading.

Thus, the network overhead traffic may adversely impact the network load as the number of data connections increases. One example is that the tracking area updates overhead may increase. Another example is that the maximum "Active+Idle User Equipment" capacity may be reached impacting service to others. A further example is that inefficient resource block allocations may occur. As a result, some devices may be denied services or may experience a low quality of service, especially during busy peak times.

OVERVIEW

In operation, an indication is received at an access node when a plurality of wireless devices assigned to a subscriber operate simultaneously as active wireless devices over a communication network. A priority list of the active wireless devices arranged according to the highest priority based on operating parameters of the active wireless devices is compiled. One of the active wireless devices is selected as a wireless host device based on the active wireless devices based upon the compiled priority list. Channel state data received from the active wireless devices at the access node is correlated to determine whether the active wireless devices and the wireless host device are in close proximity with the access node. A wireless connection is established between the wireless host device and the active wireless devices.

DETAILED DESCRIPTION

In an embodiment, an indication is received at an access node when a plurality of wireless devices assigned to a subscriber operate simultaneously as active wireless devices over a communication network. A priority list of the active wireless devices arranged according to the highest priority based on operating parameters of the active wireless devices is compiled. One of the active wireless devices is selected as a wireless host device based on the active wireless devices based upon the compiled priority list. Channel state data received from the active wireless devices at the access node is correlated to determine whether the active wireless devices and the wireless host device are in close proximity with the access node. A wireless connection is established between the wireless host device and the active wireless devices.

Figure 1:
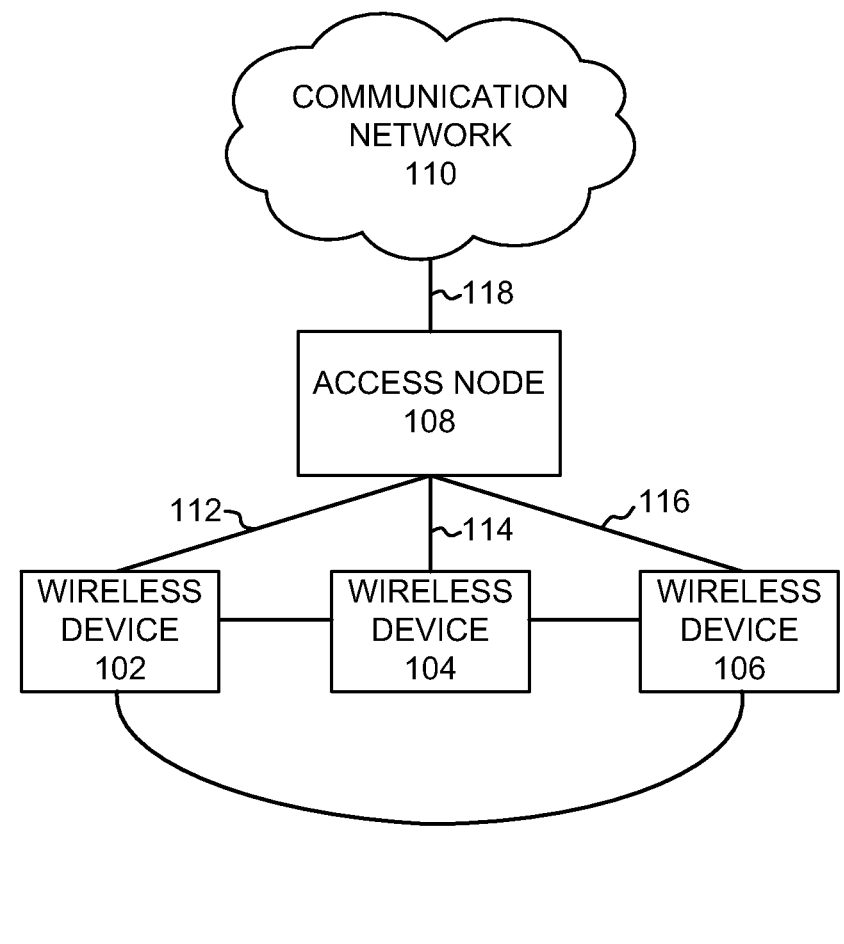
FIG. 1 illustrates an exemplary communication system for reducing network load generated by a plurality of wireless devices operating over a communication system.

FIG. 1 illustrates an exemplary communication system 100 for reducing network traffic generated in a communication system comprising a plurality of wireless devices 102, 104, and 106, access node 108, and communication network 110. Examples of the wireless devices 102, 104, 106 can include a cell phone, a smart phone, a vehicle, a vehicle having 4G communications capability, a computing platform such as a laptop, palmtop, or tablet, a personal digital assistant, an internet access device, or other similar device, including combinations thereof. Wireless devices 102, 104, 106 can communication with access node 108 over at least one communication link. Wireless device 102 can communicate with access node 108 over communication link 112. Similarly, wireless device 104 can communicate with access node 108 over communication link 114, and wireless device 106 can communicate with access node 108 over communication link 116.

Each of the wireless devices 102, 104, 106 can be, for instance, an access point and/or router and can act as a hotspot. Mobile devices equipped with wireless transceivers can connect to a network when in proximity of an access point to the network. The surrounding area where the signal strength is sufficient for access is commonly referred to as a hotspot. A hotspot is generally a site that offers Internet access to wireless-capable devices over a wireless LAN through the use of a router through a link to an Internet service provider (ISP). The wireless device may have short range communication capabilities including at least one of a wireless LAN, Wi-Fi, and Bluetooth. Many mobile devices, such as mobile phones, can function as a mobile hotspot. As such, a mobile device can extend network connectivity to other wireless devices. The mobile device can bridge wireless devices to the network. The bridge can provide Internet access from the network to the wireless devices. For example, one of the wireless devices 102, 104, 106 may be configured to distribute wireless access to one or more wireless devices. Each wireless device 102, 104, 106 can allow devices within its coverage area to access the Internet. Wireless device 102 can have a coverage area such that wireless device 104, and wireless device 106 are within its coverage area. Likewise, wireless device 104 can have a coverage area such that wireless device 102 and wireless device 106 are within its coverage area. Further, wireless device 106 can have a coverage area such that wireless device 102 and 104 are within its coverage area. While three wireless devices are illustrated in communication with access node 108 and each other, this is merely exemplary, and a substantially greater number of wireless devices can communicate with access node 108 and each other.

Access node 108 is a network node capable of providing wireless communications to wireless devices 102, 104, 106, and can be, for example, a base transceiver station or an evolved Node B (eNodeB) device. Access node 108 is in communication with communication network 110 through communication link 118. While one access node is illustrated, this is merely exemplary, and additional access nodes, as well as adjacent access nodes, can also be present in communication system 100.

Communication network 110 may comprise a wireless network, including base stations, wireless communication nodes, telephony switches, internet routers, network gateways, computer systems, communication links, or some other type of communication equipment, and combinations thereof. Communication network 110 can also comprise a wired communication network comprising processing nodes, routers, gateways, and physical and/or wireless data links for carrying data among various network elements, including combinations thereof, and can include a local area network, a wide area network, and an internetwork (including the Internet). Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 106 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 112, 114, 116, and 118 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 108 and communication network 110 which are omitted for clarity, including additional processing nodes, routers, gateways, and physical and/or wireless data links for carrying data among the various network elements.

Figure 2:
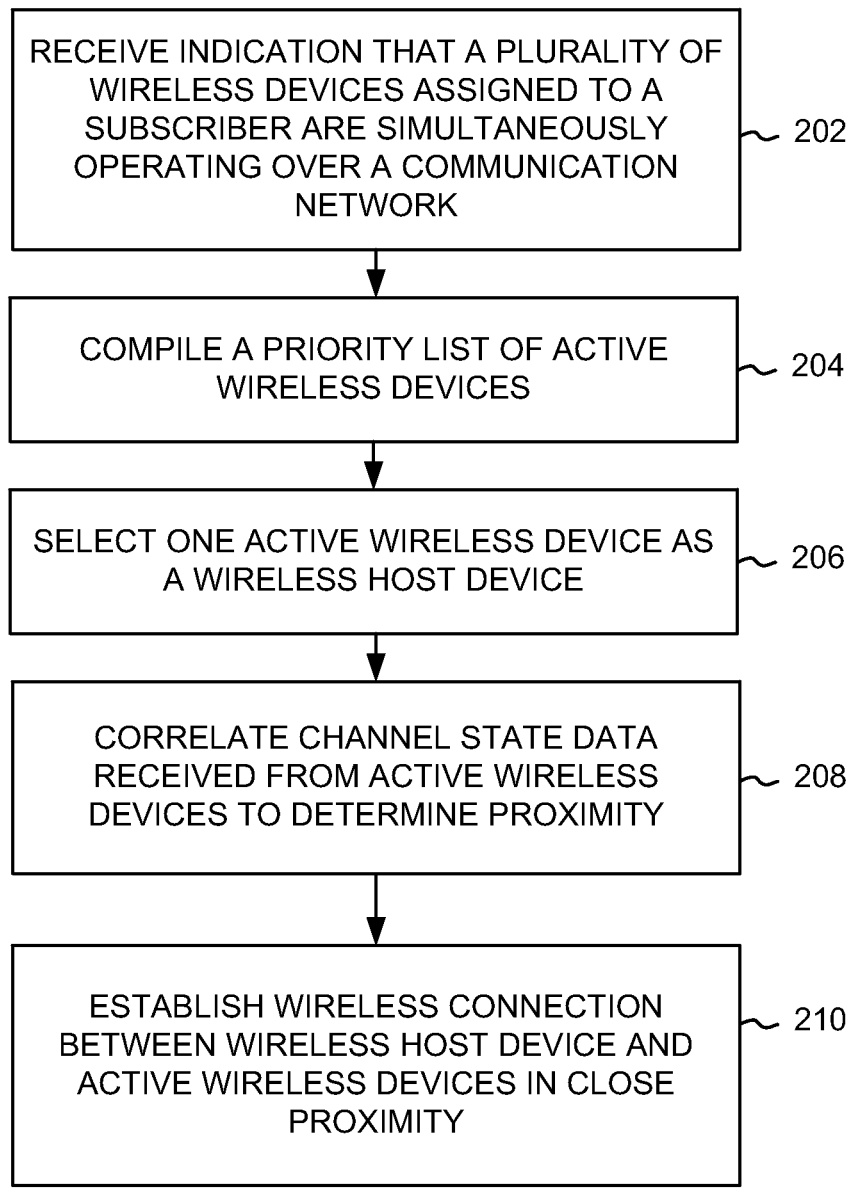
FIG. 2 illustrates an exemplary method for reducing network load generated by a plurality of wireless devices operating over a communication system.

FIG. 2 illustrates an exemplary method for reducing network traffic generated by a plurality of wireless devices operating over a communication network. In operation 202, an indication is received at an access node that a plurality of wireless devices assigned to a subscriber is operating simultaneously as active wireless devices over the communication network. For example, wireless devices 102, 104 and 106 can be collectively monitored while the wireless devices are in an idle mode or active mode and it can be determined whether multiple wireless devices assigned to a single subscriber are simultaneously operating over the communication system. In an embodiment, when the wireless device makes a transition from idle to active mode, a message containing the wireless device's context information is sent to the access node. This enables the access node in turn to create a context and manage the wireless device for the duration of its activity in active mode.

In operation 204, a priority list of all the active wireless devices assigned to the subscriber is compiled and arranged based upon the highest priority of the operating parameters of the active wireless devices. The priority list may be selected by the subscriber or may be compiled through the use of an algorithm. In an embodiment where the prioritization is computed through the use of an algorithm or other computer-executable instructions, the algorithm runs on the access node. The access node receives instructions to run the algorithm for specific wireless devices. Using the algorithm, the access node creates a priority table for each device. The access node may create a priority list based on a number of factors including, for example, the hotspot capability, multiple input multiple output (MIMO) capability, and antenna gain. Those having skill in the art would recognize that information regarding different or additional operating parameters of the wireless devices can also be obtained and used to define the priority list.

In an embodiment where the prioritization of the wireless devices is managed and configured by the subscriber, the subscriber may define a priority list for the selection of the wireless devices. In an embodiment, where the subscriber manages the device priority list but the priority list is empty, this may indicate that the subscriber has only one 4G device subscription or the subscriber may not have any hotspot capable devices.

In operation 206, one of the active wireless devices is selected as a wireless host device having hotspot capabilities based on the priority list. To reduce network loading, the algorithm selects one of the wireless devices to function as a wireless host device. During peak traffic times, the algorithm enables only the 4G data connection transmitted by the wireless host device to operate over the network instead of multiple simultaneous connections of the subscriber. By reducing the number of the wireless devices simultaneously requesting data connections, the amount of overall required bandwidth may be decreased and the network load reduced.

In operation 208, channel state data received from the active wireless devices at the access node is correlated to determine that the active wireless devices and the wireless host device are in close proximity with each other. To reduce network loading during peak times, it is more beneficial from the network's perspective to have only one connection established with the network rather than multiple simultaneous connections. In an embodiment, a channel state correlation calculation is computed to determine if the wireless host device and the active wireless devices are in close proximity to each other by determining the proximity with the access node. During periods of congestions, if the wireless host device and the active wireless devices are in close proximity, then the network connects only to a single device, the wireless host device.

In operation 210, a wireless connection is established between the wireless host device and the active wireless devices in close proximity. The communication network instructs the wireless host device to turn on its hotspot feature. The active wireless devices in close proximity to the wireless host device are instructed by the communication network to connect to the wireless host device. Then, the active wireless devices connected to the wireless host device are instructed to disconnect from the communication network and route their communications through the wireless host device to the communication network.

Figure 3:
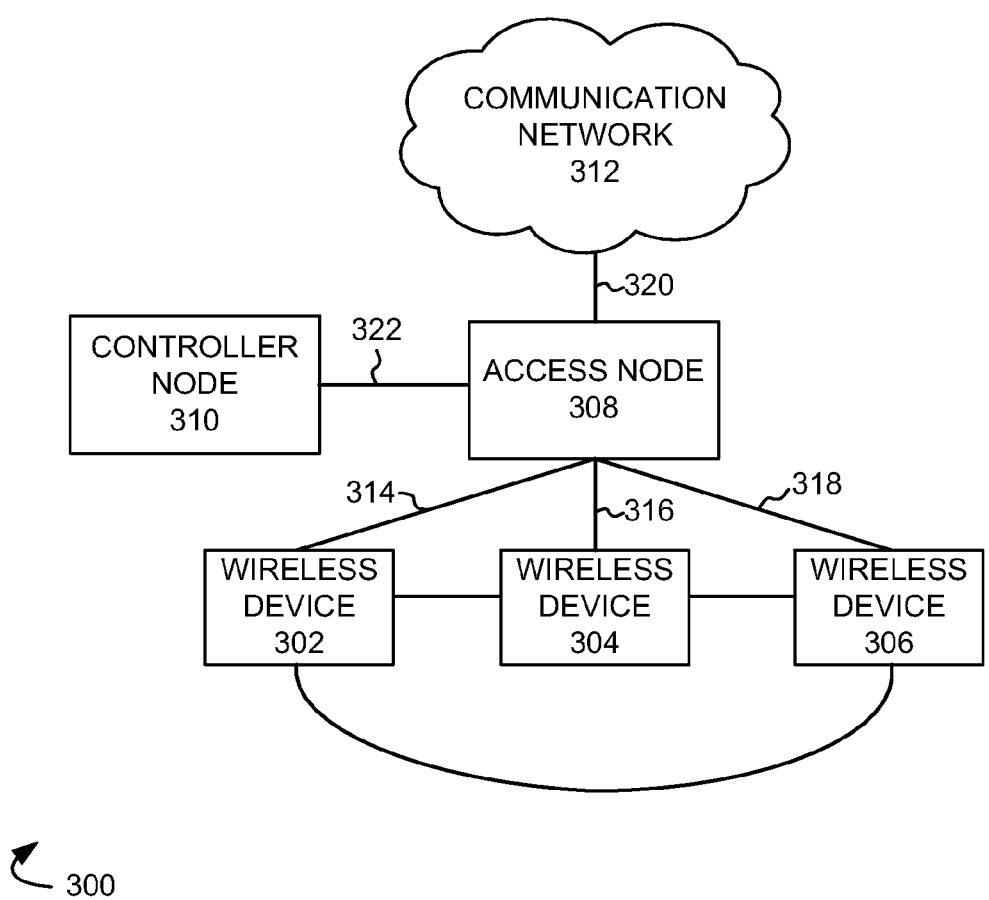
FIG. 3 illustrates another exemplary communication system for reducing network load generated by a plurality of wireless devices over a communication system.

FIG. 3 illustrates another exemplary communication system 300 for reducing network traffic generated in a communication system comprising a plurality of wireless devices 302, 304, and 306, access node 308, controller node 310, and communication network 312. Examples of the wireless devices 302, 304, 306 can include a cell phone, a smart phone, a vehicle, a vehicle having 4G communications capability, a computing platform such as a laptop, palmtop, or tablet, a personal digital assistant, an internet access device, or other similar device, including combinations thereof. Wireless devices 302, 304, 306 can communicate with access node 308 over at least one communication link, illustrated as communications links 314, 316, and 318, respectively.

Each of the wireless devices 302, 304, 306 can be, for instance an access point and/or router and can act as a wireless host device (i.e., hotspot). Many mobile devices, such as mobile phones, can function as a mobile hotspot. As such, a mobile device can extend network connectivity to other wireless devices. The mobile device can bridge wireless devices to the network. The bridge may provide Internet access from the network to the wireless devices. For example, one of the wireless devices 302, 304, 306 can be configured to distribute wireless access to one or more wireless devices. Each wireless device 302, 304, 306 can allow for devices within its coverage area to access the Internet.

Access node 308 is a network node capable of providing wireless communications to wireless devices 302, 304, 306, and can be, for example, a base transceiver station or an eNodeB device. Access node 308 is in communication with communication network 312 through communication link 320.

Controller node 310 is a network element capable of managing session states, authentication, paging, mobility with other network elements, including other wireless devices, roaming, and can perform additional bearer management functions. Examples of controller node 310 include a mobility management entity (MME), a serving gateway (SGW), a mobile switching center (MSC), or other similar network node, and can be associated with a database such as home or visitor location register. Controller node 310 is in communication with access node 308 over communication link 322.

Communication network 312 may comprise a wireless network, including base stations, wireless communication nodes, telephony switches, internet routers, network gateways, computer systems, communication links, or some other type of communication equipment, and combinations thereof. Communication network 312 may also comprise some other type of communication equipment, and combinations thereof. Communication network 312 can use wired and/or wireless protocols analogous to those described above regarding communication network 110.

Communication links 314, 316, 318, 320, and 322 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 300 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 308, controller node 310, and communication network 312 which are omitted for clarity, including additional processing nodes, routers, gateways, and physical and/or wireless data links for carrying data among the various network elements.

Figure 4:
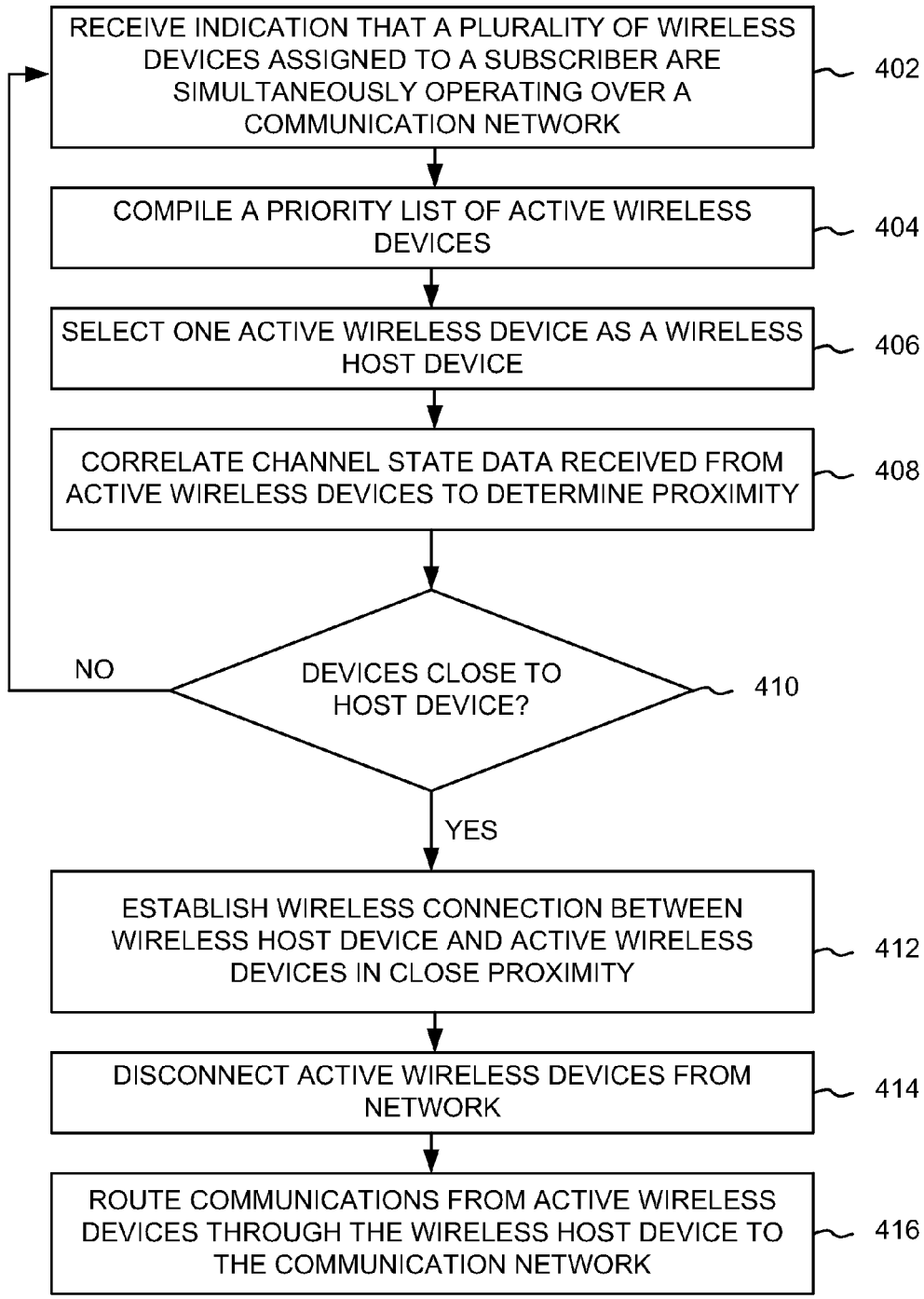
FIG. 4 illustrates another exemplary method for reducing network load generated by a plurality of wireless devices operating over a communication system.

FIG. 4 illustrates another exemplary method for reducing network traffic generated by a plurality of wireless devices operating over a communication network. In operation 402, an indication sent by the controller node is received at an access node that a plurality of wireless devices assigned to a subscriber is operating simultaneously as active wireless devices over the communication network. For example, wireless devices 302, 304 and 306 can be collectively monitored while the wireless devices are in an idle mode or active mode and it can be determined whether multiple wireless devices assigned to a single subscriber are simultaneously operating over the communication system. In an embodiment, when the wireless device makes a transition from idle to active mode, the controller node sends a message containing the wireless device's context information to the access node. This enables the access node in turn to create a context and manage the wireless device for the duration of its activity in active mode.

In operation 404, a priority list of all the active wireless devices assigned to the subscriber is compiled and arranged based upon the highest priority of the operating parameters of the active wireless devices. The priority list may be selected by the subscriber or may be compiled through the use of an algorithm. In an embodiment where the prioritization is computed through the use of an algorithm or other computer-executable instructions, the algorithm runs on the access node. The access node receives instructions from the controller node to run the algorithm for specific wireless devices. Using the algorithm, the access node creates a priority table for each device.

The access node may create a priority list based on a number of factors including, for example, the hotspot capability, multiple input multiple output (MIMO) capability, and antenna gain. In an embodiment, wireless devices having hotspot capabilities to provide Internet access from the network to other wireless devices can be assigned a higher priority than devices without hotspot capabilities. In an embodiment, a wireless device having multiple antennas to support MIMO operations can be assigned a higher priority than single antenna devices, because the MIMO capable devices can be used to overcome difficult channel conditions and/or increase channel throughput. In an embodiment, a wireless device having an antenna with a higher gain can be assigned a higher priority, because an antenna having a higher gain is generally capable of detecting weaker received signals than antennas having a lower gain. Those having skill in the art would recognize that information regarding different or additional operating parameters of the wireless devices can also be obtained and used to define the priority list.

In an embodiment where the prioritization of the wireless devices is managed and configured by the subscriber, the subscriber may define a priority list for the selection of the wireless devices. In an embodiment, where the subscriber manages the device priority list but the priority list is empty, this may indicate that the subscriber has only one 4G device subscription or the subscriber may not have any hotspot capable devices.

In operation 406, one of the active wireless devices is selected as a wireless host device having hotspot capabilities based on the priority list. To reduce network loading, the algorithm selects one of the wireless devices to function as a wireless host device. During peak traffic times, the algorithm enables only the 4G data connection transmitted by the wireless host device to operate over the network instead of multiple simultaneous connections of the subscriber. By reducing the number of the wireless devices simultaneously requesting data connections, the amount of overall required bandwidth may be decreased. Wireless networks have the ability to transmit a finite amount of information to wireless users. Therefore, these systems have difficulty handling peak traffic because the request for multiple data connections during peak times may exceed one or more of the bandwidth constraints contained within the network. One of the factors that affect the available bandwidth is the network utilization. Network utilization generally refers to the percentage of the network bandwidth that is currently in use. During peak traffic times, network utilization is generally higher than during non-peak times. During peak times, such as commute times, the available network resources are significantly lower than during non-peak times, such as late night. If the demanded throughput overloads the network, network interruption, poor quality of service, or content delivery failure may occur. By reducing the number of the wireless devices simultaneously requesting data connections, the amount of overall required bandwidth may be decreased and the network load reduced.

In operation 408, channel state data received from the active wireless devices at the access node is correlated to determine that the active wireless devices and the wireless host device are in close proximity with each other. To reduce network loading during peak times, it is more beneficial from the network's perspective to have only one connection established with the network rather than multiple simultaneous connections. In an embodiment, a correlation calculation is computed to determine if the wireless host device and the active wireless devices are in close proximity to each other by determining the proximity with the access node. During periods of congestions, if the wireless host device and the active wireless devices are in close proximity, then the network connects only to a single device, the wireless host device.

When it is determined that there are simultaneously active wireless devices operating over the network and at least one of the active wireless devices is listed on the device priority list, the algorithm periodically obtains channel state information of the active wireless devices. In an embodiment, channel state information is obtained for each active wireless device and correlated against each other. In an embodiment, the algorithm creates a correlation matrix for the active wireless devices and periodically updates the matrix. In an embodiment, the algorithm deletes from the correlation matrix correlation factors derived based on autocorrelation (i.e., correlation of the wireless device against itself). In an embodiment, active wireless devices can be identified as being in close proximity with the wireless host device based on having a high correlation factor during a predetermined time period. To be in close proximity to the host wireless device, the correlation factor of the active wireless should be consistently high during the observed time period. In an embodiment, wireless active devices can be identified as being in close proximity with the wireless hotspot device when the computed correlation factors fall, for example, within a predefined range, of say (−0.75, +0.75). The algorithm identifies the wireless devices that are most likely in close proximity with the wireless host device and instruct them to turn on their WiFi radio and scan for the WiFi hotspot from the wireless host device.

In an alternative or complementary embodiment, the access node may receive signal data including at least one of the channel state data, location, data, cell identification data and Global Positioning System data to determine that the active wireless devices and the wireless host device are in close proximity with the access node. In such an embodiment, latitude and longitude coordinates can be correlated in time at the wireless device level to determine the proximity of the devices.

When the algorithm computes a correlation factor for at least one of the active wireless devices within a predetermined range (operation 410-YES), a wireless connection is established between the wireless host device and the active wireless devices in close proximity (operation 412). In operation 414, the active wireless devices connected with the wireless host device are disconnected from the communication network. Then, in operation 416, the active wireless devices connected to the wireless host device are instructed to route their communications through the wireless host device to the communication network.

For example, the subscriber may have multiple wireless devices, such as a 4G-capable vehicle and a smart phone, assigned to operate over the communication network. The access node compares the operating parameters of the two wireless devices to determine the order of the priority list. The antennas of the 4G-capable vehicle may have a higher antenna gain and may be more capable of performing MIMO operations than the smart phone. Based on the priority list, the algorithm selects the 4G-capable device as the wireless host device. The smart phone will then be instructed to connect, for example, through the car radio which has a higher power and MIMO capabilities. The smart phone connects to the network through the 4G-capable device built in the car to leverage the higher throughputs and lower the network utilization.

Figure 5:
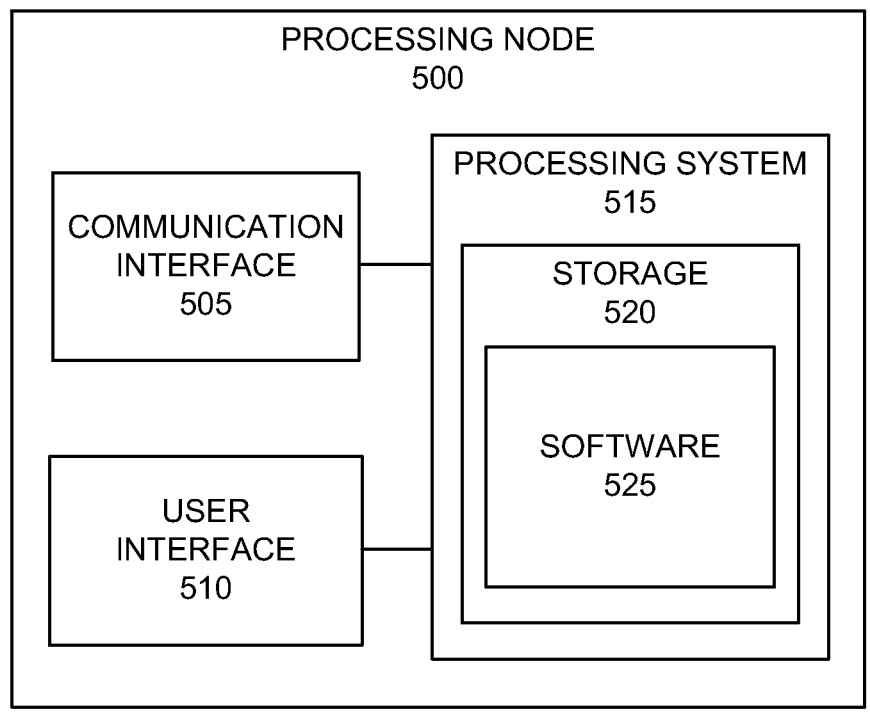
FIG. 5 illustrates an exemplary processing node in a communication system.

FIG. 5 illustrates an exemplary processing node 500 in a communication system. Processing node 500 comprises communication interface 505, user interface 510, and processing system 515 in communication with communication interface 505 and user interface 510. Processing node 500 is capable of reducing network load. Processing system 515 includes storage 520, which can comprise a disk drive, flash drive, memory circuitry, or other memory device. Storage 520 can store software 525 which is used in the operation of the processing node 500. Storage 520 may include a disk drive, flash drive, data storage circuitry, or some other memory apparatus. Software 525 may include computer programs, firmware, or some other form of machine-readable instructions, including an operating system, utilities, drivers, network interfaces, applications, or some other type of software. Processing system 515 may include a microprocessor and other circuitry to retrieve and execute software 525 from storage 520. Processing node 500 may further include other components such as a power management unit, a control interface unit, etc., which are omitted for clarity. Communication interface 505 permits processing node 500 to communicate with other network elements. User interface 510 permits the configuration and control of the operation of processing node 500.

Examples of processing node 500 include access node 108, access node 308, and controller node 310. Processing node 500 can also be an adjunct or component of a network element, such as an element of access node 108, access node 308, or controller node 310. Processing node 500 can also be another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for reducing network traffic generated by a plurality of wireless devices operating over a communication network, the method comprising:
   receiving, at an access node, an indication that a plurality of wireless devices assigned to a subscriber are active wireless devices operating simultaneously over the communication network;
   compiling a priority list of the active wireless devices arranged according to highest priority based on operating parameters of the active wireless devices;
   selecting one of the active wireless devices as a wireless host device based on the active wireless device based upon the compiled priority list;
   correlating channel state data received from the active wireless devices at the access node to determine that the active wireless devices and the wireless host device are in close proximity by:
      creating and periodically updating a correlation matrix by using an algorithm to correlate the channel state data received from each active wireless device against each other to determine correlation factors; and
      deleting from the correlation matrix correlation factors derived based on autocorrelation; and
   establishing a wireless connection between the wireless host device and the active wireless devices.

2. The method of claim 1, wherein receiving, at the access node, the indication further comprises receiving the indication from a control node.

3. The method of claim 1, further comprising:
   receiving at the access node for each active wireless device at least one of channel state data, location data, cell identification data, and Global Positioning System (GPS) data.

4. The method of claim 1, wherein the active wireless devices in close proximity with the wireless host device have a high correlation factor during a particular period of time.

5. The method of claim 1, wherein the active wireless devices in close proximity with the wireless host device have a correlation factor within a range of $\{-1, +1\}$.

6. The method of claim 1, wherein establishing the wireless communication further comprises:
   disconnecting the active wireless devices connected with the wireless host device from the communication network; and
   routing communications from the active wireless devices connected with the wireless host device through the wireless host device to the communication network.

7. The method of claim 1, wherein compiling a priority list of the active devices further comprises:
   compiling the priority list of the active wireless devices arranged upon highest priority based on operating parameters of the active wireless devices based on at least one of hotspot capability, multiple input multiple output (MIMO) capability, and antenna gain.

8. The method of claim 1, wherein the plurality of wireless devices includes a plurality of active wireless devices and idle wireless devices.

9. The method of claim 1, wherein selecting the wireless host device further comprises:
   selecting the wireless host device is based upon leveraging higher network throughputs and lower network utilization.

10. The method of claim 1, wherein the plurality of wireless devices have short range communication capabilities including at least one of a wireless LAN, Wi-Fi, and Bluetooth.

11. The method of claim 1, wherein the plurality of wireless devices comprises at least one of a motor vehicle, a vehicle having communications capability, a personal digital assistant (PDA), a cellular phone, a mobile phone, a smartphone, a computer, a laptop computer, a tablet computer, an electronic device, an electronic gaming device, and a digital camera.

12. A system for reducing network traffic generated by a plurality of wireless devices operating over a communication network, the system comprising:
   a processing node configured to
      receive an indication at an access node that a plurality of wireless devices assigned to a subscriber are active wireless devices operating simultaneously over the mobile network;
      compile a priority list of the active wireless devices arranged according to highest priority based on operating parameters of the active wireless devices;
      select one of the active wireless devices as a wireless host device based on the active wireless device based on the compiled priority list;
      correlate channel state data received from the active wireless devices at the access node to determine that the active wireless devices and the wireless host device are in close proximity; and
      establish a wireless connection between the wireless host device and the active wireless devices in close proximity;

disconnect the active wireless devices connected with the wireless host device from the communication network; and route communications from the active wireless devices connected with the wireless host through the wireless hotspot device to the communication network.

13. The system of claim 12, wherein the processing node is further configured to:

create and periodically update a correlation matrix by using an algorithm to correlate the channel state data received from each active wireless device against each other to determine correlation factors; and delete from the correlation matrix correlation factors derived based on autocorrelation.

14. The system of claim 12, wherein the processing node is further configured to:

receive at the access node for each active wireless device at least one of channel state data, location data, cell identification data, and Global Positioning System (GPS) data.

15. The system of claim 12, wherein the plurality of wireless devices includes a plurality of active wireless devices and idle wireless devices.

16. The system of claim 12, wherein the processing node is further configured to:

select the wireless host device based upon leveraging higher network throughputs and lower network utilization.

17. The system of claim 12, wherein the plurality of wireless devices have short range communication capabilities including at least one of a wireless LAN, Wi-Fi, and Bluetooth.

18. A method for reducing network traffic generated by a plurality of wireless devices operating over a communication network, the method comprising:

receiving, at an access node, an indication that a plurality of wireless devices assigned to a subscriber are active wireless devices operating simultaneously over the communication network;

compiling a priority list of the active wireless devices arranged according to highest priority based on operating parameters of the active wireless devices;

selecting one of the active wireless devices as a wireless host device based on the active wireless device based upon the compiled priority list;

correlating channel state data received from the active wireless devices at the access node to determine that the active wireless devices and the wireless host device are in close proximity establishing a wireless connection between the wireless host device and the active wireless devices;

disconnecting the active wireless devices connected with the wireless host device from the communication network; and routing communications from the active wireless devices connected with the wireless host through the wireless hotspot device to the communication network.

* * * * *